United States Patent [19]

Leonard

[11] Patent Number: 4,659,073

[45] Date of Patent: Apr. 21, 1987

[54] DATA READING APPARATUS

[75] Inventor: George H. Leonard, Darien, Conn.

[73] Assignee: GTech Corporation, Providence, R.I.

[21] Appl. No.: 553,846

[22] Filed: Nov. 21, 1983

[51] Int. Cl.⁴ .............................................. B65H 5/06
[52] U.S. Cl. ........................................ 271/3; 271/254;
  271/272; 271/275; 271/900
[58] Field of Search ....................... 271/3, 9, 226, 234,
  271/239, 248, 253, 254, 255, 272, 268, 273, 274,
  275, 277, 900; 346/134, 138; 360/87; 235/483,
  485; 198/788

[56] References Cited

U.S. PATENT DOCUMENTS

| | | | |
|---|---|---|---|
| 1,536,635 | 5/1925 | Smith | 400/578 |
| 1,838,624 | 12/1931 | Horn | 271/236 |
| 1,898,551 | 2/1933 | MacCutcheon | 198/788 |
| 2,695,785 | 11/1954 | Dashiell et al. | 346/138 |
| 2,847,223 | 8/1958 | Taylor et al. | 346/138 |
| 3,056,134 | 9/1962 | Beyer | 346/138 |
| 3,207,506 | 9/1965 | Limberger | 271/3 |
| 3,614,090 | 10/1971 | Del Vecchio | 271/277 |
| 3,614,091 | 10/1971 | Bernardis | 271/251 |
| 3,697,968 | 10/1972 | Low et al. | 346/138 |
| 3,941,375 | 3/1976 | La White et al. | 271/251 |
| 3,955,889 | 5/1976 | Ishiguro et al. | 271/900 |
| 4,324,480 | 4/1982 | Nomura et al. | 271/9 |
| 4,428,501 | 1/1984 | Osaka | 271/9 |
| 4,504,052 | 3/1985 | Murek et al. | 271/9 |

FOREIGN PATENT DOCUMENTS

| | | |
|---|---|---|
| 0004853 | 1/1982 | Japan . |
| 0013048 | 1/1982 | Japan . |
| 0077143 | 5/1982 | Japan ........................ 271/111 |
| 2076341 | 12/1981 | United Kingdom . |

OTHER PUBLICATIONS

*IBM Technical Disclosure Bulletin*, vol. 13, No. 10, Mar. 1971, p. 3070, Walton, N. D., "Multiple Copy Control for Typewriters".
*IBM Technical Disclosure Bulletin*, vol. 26, No. 4, Sep. 1983, p. 1834, Bratton, W. E. et al, "Spring-Loaded Round Platen".

*Primary Examiner*—Richard A. Schacher

[57] ABSTRACT

The disclosed data reading apparatus carries an inserted sheet continuously inward and around a drum where data on the sheet is sensed optically and out of the apparatus reversely, close to the point of insertion. Sheets of different widths are aligned initially, and are held against the drum by tensioned belts. The drum "floats", being movable toward and away from the data reader to accommodate abnormal sheet thickness, wrinkling, etc. and to limit the sensing gap. Jamming of an inserted sheet is virtually eliminated by the floating drum and other special provisions. The entire apparatus is very compact, due in part to making the drum hollow and mounting the drive motor in the hollow.

17 Claims, 17 Drawing Figures

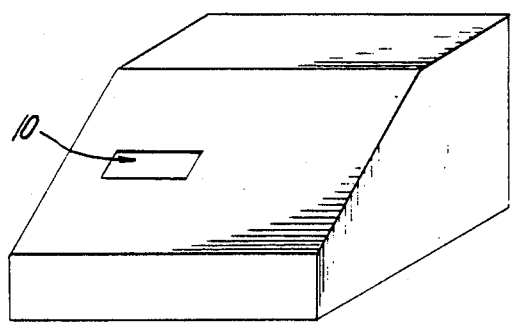
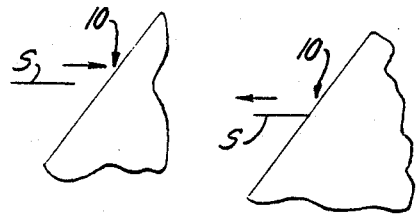
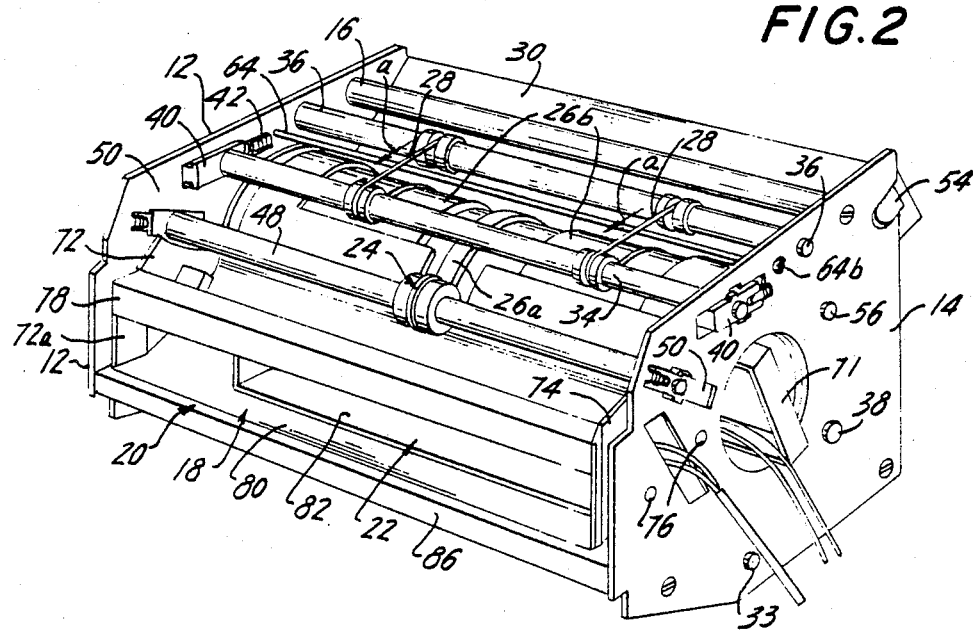
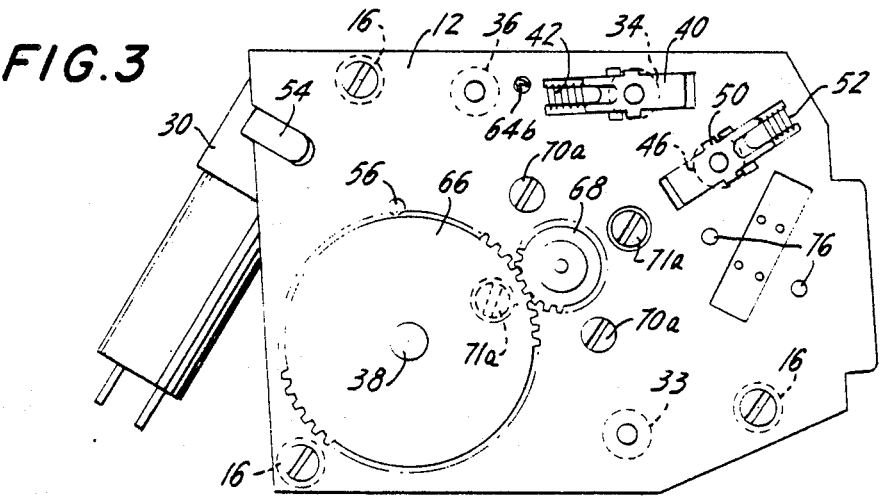

DATA READING APPARATUS

The present invention relates to data reading apparatus and to sheet feeders useful in data readers.

Data readers are widely used in games of chance, for entering data appearing on sheets of the participants into computers. Large numbers of data readers are installed at many locations for convenient access by the participants. Such apparatus should be compact, economical to produce, dependable and durable, and capable of processing large numbers of sheets rapidly.

Commonly, data-bearing cards or sheets are fed from an entry point along a path past a reading head to a discharge point more-or-less remote from the entry point, resulting in relatively bulky apparatus. Data reading apparatus has been developed specially for games of chance wherein a data-bearing card is inserted at an entry throat, fed into the apparatus where it is read and it is returned via the entry throat, its direction of feed reversing in the process. The reversing feed mechanism slows the process and involves complexity that may cause breakdown and that is inherently slow.

Many aspects of the present invention are achieved in the illustrative embodiment described in detail below and shown in the accompanying drawing. Higher speed of operation and compactness are promoted by a feeder that carries the sheets continuously from the entry end of a path, past a data reading head, to the delivery end at essentially the same location as the entry end. The novel data reader has the capacity to adjust sheets inserted at an angle into alignment with the desired path of the sheets past the data reader. A single entry throat is usually suitable. However, the same apparatus has the capability of being equipped with multiple throats where different kinds of data-bearing sheets are to be processed. Detectors are provided to sense the entry of a sheet into a throat as for starting the motor of the sheet feeding means and for distinguishing between sheets inserted in the different throats. As a result, the data that is provided by the reading head to a data processor can be processed differently in accordance with the throat that received the sheet. (The present invention does not relate to the details of control of the data processor.)

A rapid cycle of feeding and reading data from an inserted sheet is promoted by providing entry and exit throats at essentially the same location and sheet-feeding means organized so that a sheet is inserted in an initial direction; it is carried around a drum that presents the data on the sheet to the reading head; and it leaves the drum and enters the exit throat in essentially the opposite direction, travelling continuously.

Compactness of the apparatus is enhanced by making the drum hollow and locating the drive motor for the sheet-feeding means in the hollow of the rotary drum. By virtue of this feature, no space whatever needs to be allocated to the drive motor.

A valuable attribute of the illustrative embodiment of the invention is its capacity to handle deformed sheets that may be wrinkled, for example. Such a sheet may well be successfully scanned by the reading head. However, even if the deformation of a sheet is so bad that reading is unsuccessful, the sheet may well be successfully fed through the apparatus which, accordingly, continues to be operative. Jamming is avoided except in extreme cases, where sheets are so badly deformed that they should not be inserted. The apparatus is also well adapted to accommodate other abnormal conditions, as when two sheets are inadvertently inserted together.

The sheets are held against the sheet-supporting cylindrical surface of the drum. The curvature imposed on the sheet in this manner tends to smooth moderately wrinkled sheets that are carried by the drum past the reading head. In the exemplary apparatus detailed below, endless belts are used for holding the sheets against the drum. The belts tend to accommodate local deviations in sheet thickness, such as wrinkling that may persist despite curving of the sheet around the drum. Each of the belts is looped about multiple pulleys, and each belt includes a sheet-gripping length around a large arc of the drum and a return length, and the belts are tensioned. Elastic belts might be used. However, more durable inelastic belts are used in the exemplary apparatus. Tension is developed by a spring-biased movably mounted idler pulley for each endless belt.

The drum in the illustrative embodiment is "floating", i.e., its axis can be shifted such that the spacing of the drum from the data reading head can be varied. In this sense, the drum is movable toward and away from the reading head. This feature is used to advantage for several purposes. Overly thick sheets such as badly deformed sheets can be accommodated between the reading head and the drum because of its "floating" characteristic. During any such shift of the drum, the tensioned belts hold the sheet firmly against the drum.

The reading gap for a sheet of normal thickness in good condition is established with a minimum of tolerances, tolerances that are readily controlled. Gaging discs are carried by the reading head that cooperate with the drum. The floating drum is spring-biased to develop that gaging cooperation.

As a related feature, gaging means is provided to assure a minimum reading gap between the sensing face of the reading head and the data-bearing face of a sheet carried by the drum past the reading head, despite abnormal sheet thickness. In the exemplary illustrative embodiment, a gaging blade is disposed between the data-sensing face of the reading head and the data-bearing face of the sheet being carried by the drum past the reading head. Overly thick sheets or sheet areas engage the gapping blade and force the sheet-supporting drum to shift away from the reading face, preserving a minimum reading gap.

Still further features of the apparatus described below are included for enhancing the immunity of the feeding means to jamming. The exit throat is wider than the entry throat (or either entry throat) to facilitate travel of a sheet after it has moved past the reading head. Additionally, the transition between the sheet feeding means and the exit throat provides special guidance to assure dependable discharge of the sheets. The leading edge of a sheet that leaves the drum may be springy and it may be deformed; and in some instances, it might stick to the drum. Guide formations are provided that tend to strip a traveling sheet away from sheet-feeding parts and to gather deformed portions of a sheet leaving the feeding mechanism to be received smoothly and dependably in the exit throat.

The foregoing and other distinctive features of the invention will be best appreciated from the following detailed description of an illustrative embodiment of the invention. Many of the features coact for particularly desirable results, yet some features may be omitted where their function may not be necessary, and the features of the described apparatus may be modified and they may be used to advantage with other apparatus. The described apparatus is exemplary and is the presently preferred embodiment of the various aspects of the invention.

IN THE DRAWINGS

FIG. 1 is an isometric view of a data reader;

FIGS. 1A and 1B are fragmentary side views of the apparatus of FIG. 1, illustrating insertion and delivery of a date-bearing sheet;

FIG. 2 is a perspective view of novel data reading apparatus, as an illustrative embodiment of the various features of the invention;

FIG. 3 is an end view of the illustrative embodiment from the left of FIG. 2;

Figure 4:
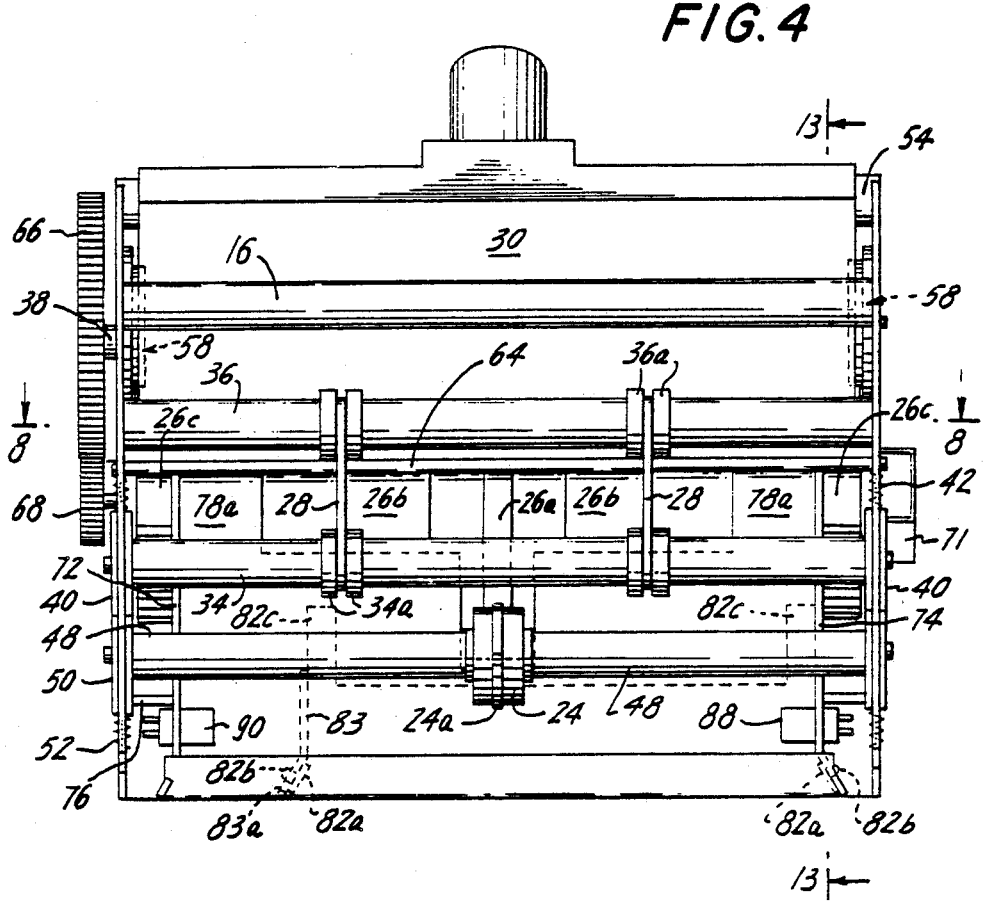
FIG. 4 is a top plan view of the apparatus of FIG. 2.
Figure 5:
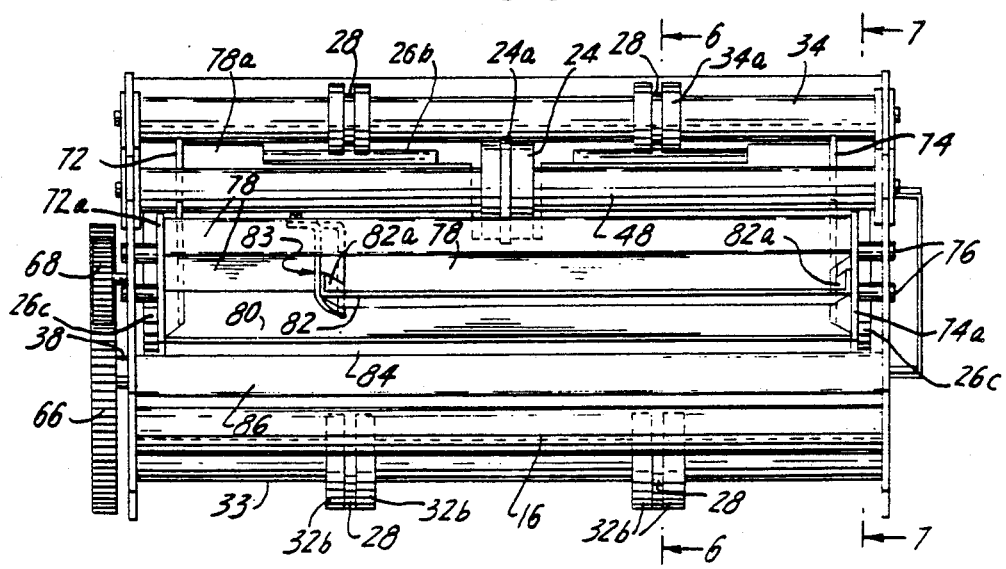
FIG. 5 is a front elevation of the apparatus of FIG. 2.

Referring now to the drawings, the data-reading apparatus of FIG. 1 has a port 10 at which the data-bearing sheets are inserted and delivered. As represented in FIGS. 1A and 1B, these sheets S are inserted and returned at the same port 10. This is a characteristic of the operation of similar apparatus known heretofore, having the advantage of conserving the space in the apparatus devoted to sheet-feeding. In prior apparatus of this kind, it was customary for the sheet to be fed into the machine, and then to be reversely ejected while data-reading takes place. The present apparatus, however, feeds the sheet in a continuous path of travel into the apparatus, around a drum, where the data is read, ending with ejection of the sheet at the entry port. Many advantages result from avoiding the feed-reversal as in the past, including a shorter cycle of reading each individual sheet; eliminating the cost of feed-reversal controls; and avoiding potential breakdown associated with the feed-reversal.

Figure 6:
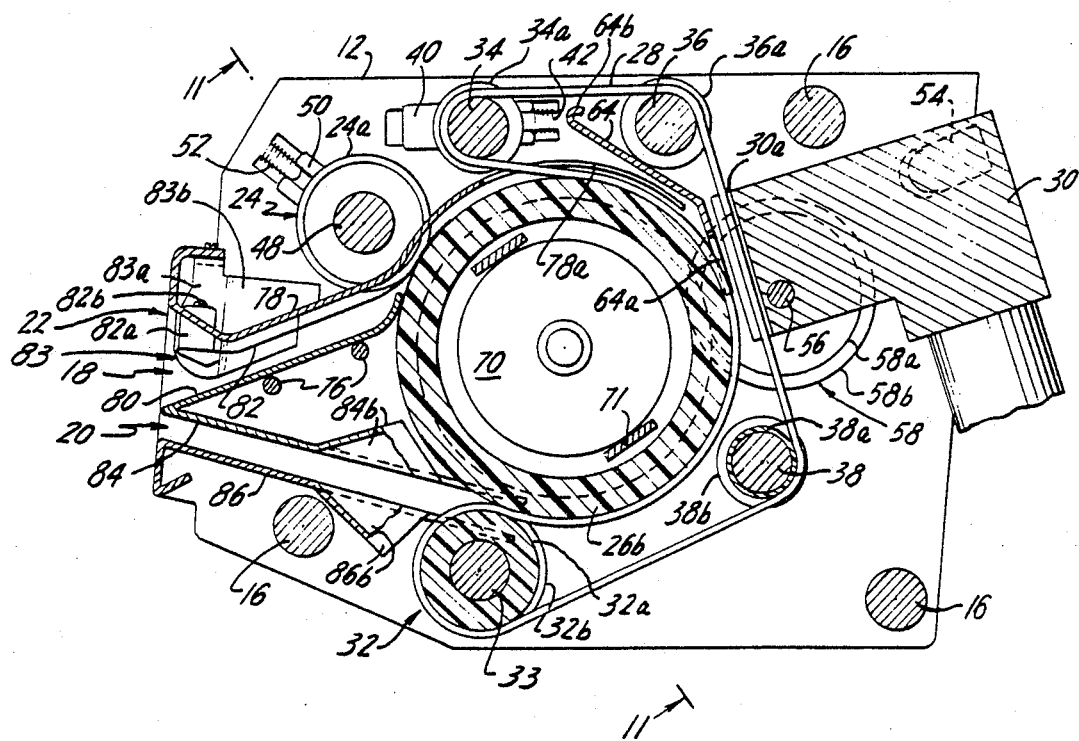
FIG. 6 is an enlarged vertical cross-section of the apparatus of FIG. 5 at the plane 6—6 therein.

In FIGS. 2 to 6, the apparatus includes left frame-plate 12 and right frame-plate 14 that are unified by three rods 16 (note FIG. 6). Sheets may enter the apparatus at a guide structure providing an entry throat 18, and the sheets then leave at a wider exit throat 20. A second entry throat 22 is also provide, narrower than throat 18.

Sheets entering the apparatus are gripped between a pressure rotor 24 and a raised band 26a of drum 26. The drum is driven so that sheets that are gripped between the nip 24–26a and are guided along a short travel path whereupon they become gripped between drive belts 28 and the drum.

Figure 13:
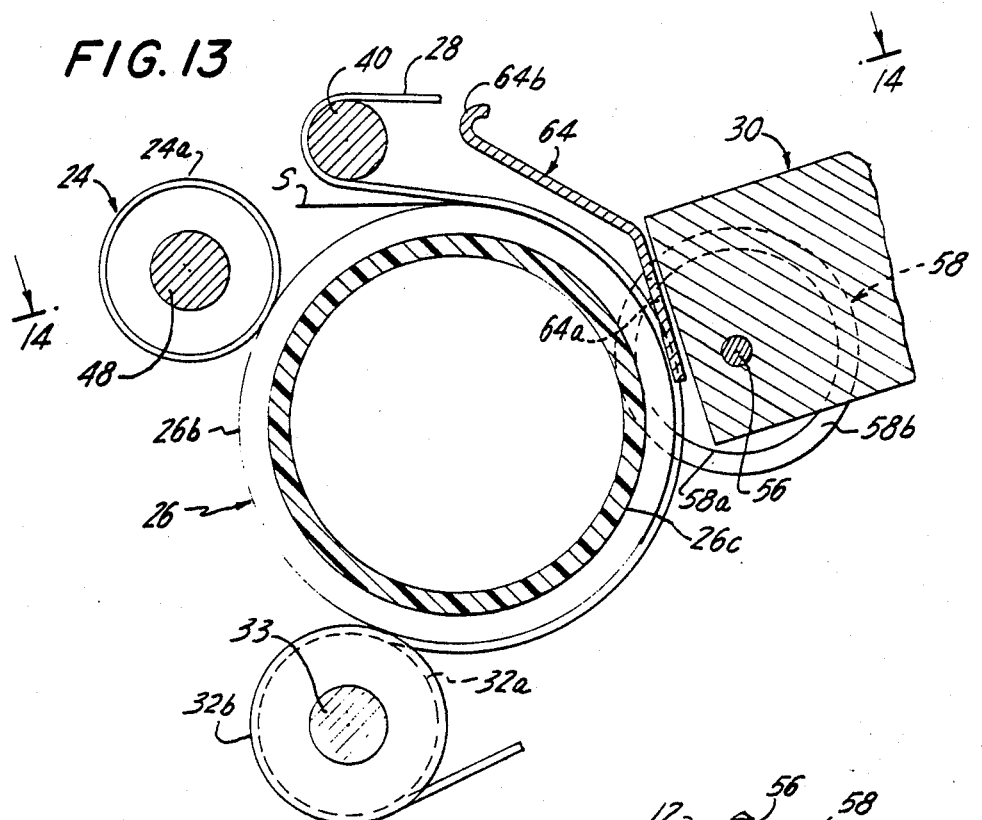
FIG. 13 is an enlarged diagrammatic cross-section of certain components of the apparatus in FIGS. 2–6 at the plane 13—13 in FIG. 4.

Sheets are carried by drive belts 28 and drum 26 along a path past reading head 30 which is shown diagrammatically in FIGS. 6 and 13. Belts 28 operate in the direction represented by the arrows a (FIG. 2). The return loops of the belts pass through slots 30a in the reading head 30.

Carried by drum 26 and belts 28, the sheets S which are carried to reading head 30 are carried forward (clockwise in FIG. 6) and discharged via exit or delivery port 20.

As best seen in FIG. 6, belts 28 are tensioned against drum parts 26b in the absence of a sheet, and when a sheet is being carried along a path past reading head 30, the belts grip the sheet against the drum. Below drum 26 (FIG. 6) the belts are looped around a pair of idlers 32 on a rotary shaft 33, and above drum 26 the belts are tensioned around rotary shaft 34. Pairs of flanges 34a are fixed to shaft 34 flanking each of the belts which acts as idlers for the two belts. The lengths of belts 28 between idlers 32 and 34 extending around the drum may be called the gripping lengths. Each return loop extending from idler 32 to idler 34 is looped about a rotary shaft 36 and about drive shaft 38. Shaft 36 has pairs of flanges 36a fixed thereto at opposite edges of each belt. Shaft 34 is supported by a pair of take-up bearings 40 at its extremities. These take-up bearings operate in slots in plates 12 and 14, respectively, and are biased to the left in FIG. 6 by compression springs 42. Accordingly, idler 34 which is movably mounted and under spring bias, tensions the gripping lengths of the belts around drum 26 and tensions the return loops of the belts around pulleys 32, idlers 34 and 36 and around drive pulleys 38.

Drum 26 has no fixed bearings and therefore is a "floating" drum. The tension developed by the gripping lengths of the belts around a major part of drum 26 biases the entire drum bodily to the left in FIG. 6. Flanges 32b of pulleys 32 provide support for the drum at one arcuate location, and at another arcuate location rotor 24 biases drum 26 toward the reading head 30. Rotor 24 is supported on shaft 48 that rotates in sliding bearings 50 at its extremities. These bearings are slidable in plates 12 and 14, and they are biased by compression springs 52 to press drum 26 against coaxial idlers 32 and against flanged discs 58 (described below) at the ends of reading head 30.

Pulleys 32 are rotated frictionally by belts 28 that bear against hubs 32a flanked by pairs of flanges 32b. The radius of a hub 32a driven by contact with a belt 28 ordinarily is slightly smaller than the radius of flanges 32b. Flanges 32b bear against drum 26; and because flanges 32b and the sheet-supporting surfaces 26b of drum 26 move at different surface speeds, some slip may occur at the surfaces of rims 32b, but it is of no consequence. Alternatively, hubs 32a and flanges 32b may be independently rotatable, in which case there would be no slip at the flange surfaces.

Figure 14:
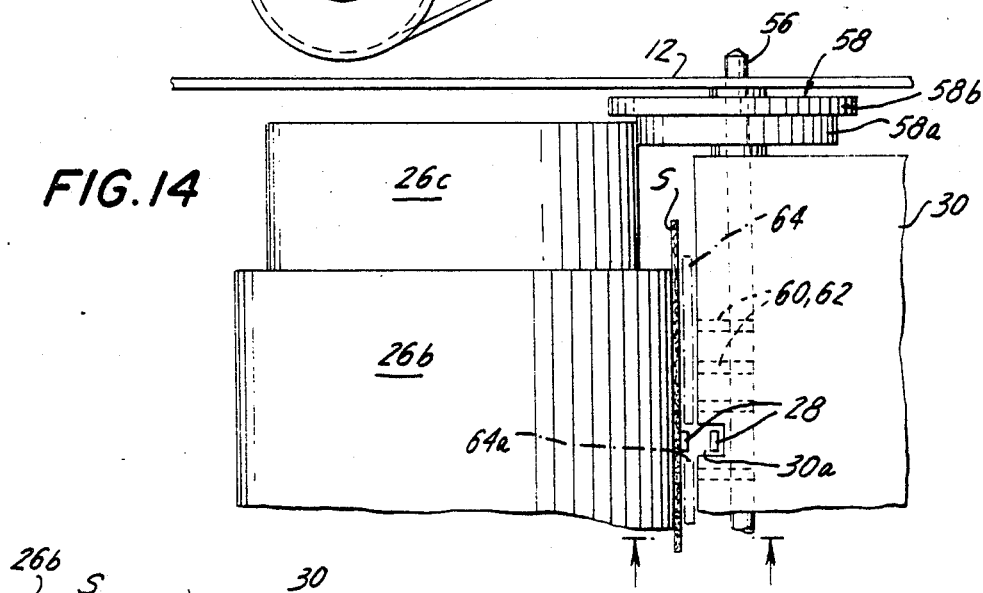
FIG. 14 is an enlarged view of parts of the apparatus of FIGS. 2-6 as seen from the plane 14-14 in FIG. 13.

Reading head 30 is supported between frame plates 12 and 14 on fixed shaft 56 snugly received in holes in plates 12 and 14. Projections 54 at the ends of head 30 are received in slots (see FIG. 3) extending radially from shaft 56. Flanged gaging discs 58 are located between the ends of reading head 30 and plates 12 and 14 (FIGS. 13 and 14). Discs 58 have gaging rims 58a in cooperation with end portions 26c of drum 26. Endwise shift of drum 26 is restricted by flanges 58b.

Drum 26 and belts 28 carry a sheet past the reading head, holding the sheet against the drum for over 180° in this example. Due to the belts, to nip rotor 24 and to the entry and exit throats and their sheet-guiding surfaces, the sheets enter and are reversely ejected at a common location, travelling continuously.

Springs 52 are much more powerful than springs 42. Thus, despite the effect of springs 42 in tensioning the driving lengths of the belts around the drum (therefore tending to shift the drum to the left in FIG. 6), the bias of springs 42 is more than overcome by the bias of springs 52 acting on drum 26 via shaft 48 and rotor 24. Rotor 24 applies this bias to drum 26 between the ends of the drum, being one way of ensuring spring-biased bearing of both end portions 26c of the drum against gaging rims 58a at the ends of reading head 30. Incidentally, drum portions 26c could be flush with portions 26b. However, drum portions 26c are recessed below paper-supporting areas 26a and 26b of the drum to allow space for sheet edge guides 72 and 74 (see below) to dip radially below sheet-supporting drum areas 26a and 26b, thereby to be more effective edge guides. Recessed drum portions 26c are made wide to accommodate various entry-throat widths as may be needed for various sheet widths.

Considering FIGS. 6 and 13, it is evident that floating drum 26 will be pressed against rims 32b of pulleys 32 and ordinarily against gaging rims 58a of discs 58. Under abnormal conditions, as in the case of a badly wrinkled sheet or in case two sheets are inserted together, the floating drum can shift away from reading head 30, thereby avoiding paper jams. The floating drum contributes notably to successful feed operation under abnormal conditions.

Figure 15:
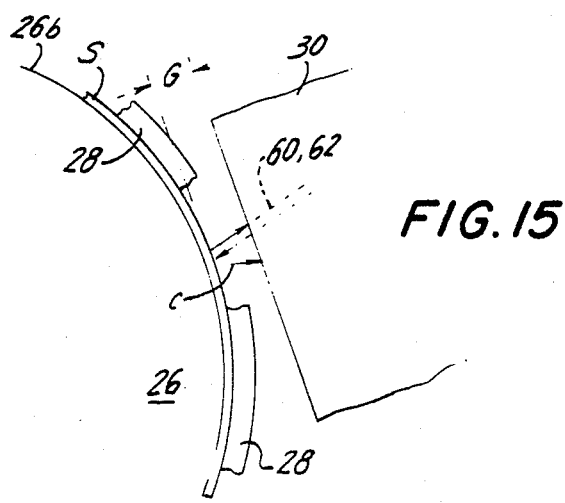
FIG. 15 is a fragmentary view of components in FIG. 14 at the plane 15—15 in FIG. 14, greatly enlarged.

As seen in FIGS. 14 and 15, reading head 30 includes a row of bundles of fiber-optic filaments 60 which carry light toward the sheets on the drum. Mixed with filaments 60 in each bundle are fiber-optic filaments 62 that transmit reflected light to photo-sensing elements in the head (not shown). The ends of these fiber-optic bundles define a reading line where the curved paper surface is nearly tangent to—but spaced from—the reading head 30. The normal reading gap G (FIG. 15) is limited by engagement of rims 58a with drum portions 26c. Illumination of the reading line is reflected or absorbed by light or dark areas on the sheet, which is recognized by circuitry connected to the photo-sensing elements. It is of course possible that light could be reflected from shiny darkened areas of the sheet, so that mis-reading could occur. The geometry of the sensing zone is adjusted so that glare reflections (arrows c) are directed away from sensing fiber-optic fibers 62. For the sensing process to be effective, gap G between the face of the sensing head and the sensed surface of the sheet S is relatively critical.

As indicated above, gaging rims 58a of discs 58 cooperate with drum surfaces 26c to limit the biased movement of drum 26 toward reading head 30. Shaft 56 has a tight fit in head 30 and in gaging discs 58. A uniform gap G is established (for sheets of standardized thickness) by maintaining a uniform location of shaft 56 relative to the face of reading head 30, by maintaining uniform radii of gaging rims 58a and by maintaining a uniform radial relationship between surfaces 26c and surfaces 26a and 26b. Relatively few tolerances are involved, and they are easily controlled, so that, for sheets within a normal thickness range, gap G can readily be limited to a specified maximum value.

It will be appreciated that some portions of a sheet carried by drum 30 past the reading head may not conform to the drum surface. Despite the inherent tendency of a sheet to be freed of wrinkles by being curved around drum 26, some wrinkling may persist. Additionally, the stiffness of the sheet tends to lift its leading and trailing edges away from the drum. Still further, double sheets or excessively thick sheets might be inserted, or a sheet may have staples, etc. Blade 64 is interposed between reading head 30 and the sheet surface to limit the reading gap G to a specified minimum value. Gage blade 64 has pivots 64b at its upper edge, and its lower margin is interposed between sheet S and head 30 just above the reading line. Blade 64 has slots 64a to accommodate belts 28.

As indicated, blade 64 assures a minimum reading gap between the sensing head and the sheet surface. Additionally, it prevents contact of the sheet against the reading head and thus protects the reading head from dirt and wear and other damage that could result from such contact. Blade 64 is thinner than gap G as limited by gaging rims 58a, so that blade 64 normally remains loose in gap G. However, even when drum 26 presses a thick sheet toward head 30, the sheet can only be pressed against blade 64 so that a minimum reading gap is preserved, equal to the thickness of the blade. Spring-biased rotor 24 allows drum 26 to shift away from reading head 30 accordingly.

Drive shaft 38 mentioned above has a pair of pulleys for the two belts 28. Each pulley has a hub portion 38a having a high coefficient of friction in relation to the belts and a pair of flanges 38b for each belt. Shaft 38 and its pulleys are driven by a large gear 66 (FIGS. 3, 4 and 5) in mesh with pinion 68. Pinion 68 is driven, in turn, by a shaft of motor 70 screwed to frame plate 12. The only reduction gearing that is necessary in this apparatus is that provided by pinion 68 and gear 66 and by pulleys 38a which operate belts 28. These belts rotate the drum and they carry the sheets with the drum as the belts travel.

Figure 11:
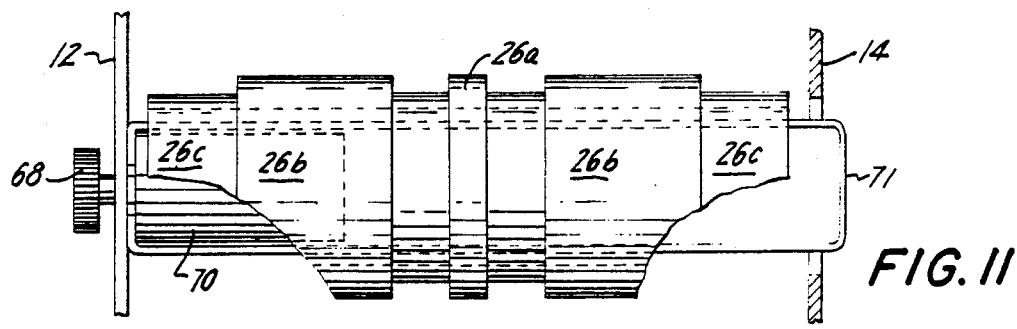
FIG. 11 is a fragmentary view of certain portions of the apparatus of FIGS. 2 through 6, as seen from the plane 11—11 in FIG. 6.

In apparatus of this kind, compactness is of considerable importance. In one respect, this is accomplished in the present apparatus by housing motor 70 in the hollow of drum 26. This is shown in FIG. 6 and, particularly, in FIG. 11. Motor 70 is shown secured to frame plate 12 by screws 70a, within drum 26. Ample clearance is provided between the motor and the drum to accommodate a wide range of movement of the drum. A handling frame 71 is secured to the motor by screws 71a. Frame 71 extends through a hole in frame plate 14 and it is accessible for removing the motor when the motor has been released from frame plate 12, as may be necessary for servicing. Wiring to the motor may be lashed to frame 71, as a further purpose of the frame. By mounting the motor in this manner, no space must be allocated to the motor itself. The motor occupies only that space which is preempted in any case by the sheet-feed drum.

Wide sheet entry throat 18 and narrow sheet entry throat 22 were mentioned above, as was wide exit throat 20. These throats are defined by a number of surfaces that guide the edges and the top and bottom surfaces of the inserted sheets. Entry throats 18 and 22 are formed in part by sub-frame plates 72 and 74 which are supported, in turn, by rods 76 whose ends are fixed to plates 12 and 14. With this construction, it is feasible to remove any throat structure and insert a substitute where different-width throats may be desired. Top entry throat plate 78 extends from one sub-frame plate 72 to the other 74. Bottom entry plate 80 and top exit-throat plate 84 are formed of one piece. These also extend from one sub-frame plate 72 to the other 74. Bottom exit-throat plate 86 extends from frame plate 12 to the opposite frame plate 14. Sub-frame plates 72 and 74 have outward-flared front portions 72a and 74a.

Left-hand vertical guide member 83 (FIGS. 4, 5, 6 and 12) of the narrow throat is secured to both top plate 78 of the wide throat and to member 80, 84. Member 83 includes an outward flared front portion 83a and a rearward portion 83b parallel to edge guides 72 and 74 of the wide throat. Member 83 extends through plate 78 (FIG. 6) and downward a bit below blade 82, forming the left edge guide of the narrow throat. Blade 82 includes a pair of upright tabs 82a at the entry portion of the narrow throat, against flared portion 83a and against the flared portion 74a of member 74. Tabs 82a have nibs 82b extending outward through small holes in members 83 and 74. These nibs support blade 82 so that it can flutter up and down freely, the nibs serving as pivots.

Plates 78, 80, 82, 84 and 86 serve as face guides for the sheets entering and leaving the apparatus. Portions 78a of entry-throat plate 78 (FIGS. 4 and 8) extend roughly 90 degrees around drum 26. Entry-throat blade 82 has portions 82c extending arcuately past the sheet-gripping nip of rotor 24 and drum 26. Sub-frame plates 72 and 74 flank raised sheet-support portions 26b of drum 26 and nearly engage reduced-diameter end portions 26c of the drum. Accordingly plates 72 and 74 including their flared entry portions 72a and 74a and their arcuate extensions, e.g. extension 74a (FIG. 7), form edge guides for wide sheets. Member 83 and plate 74 form edge guides for narrow sheets.

Figure 12:
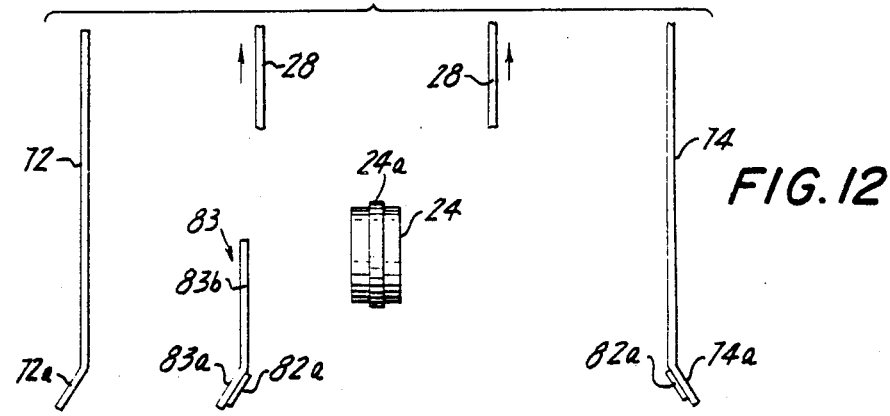
FIG. 12 is a diagrammatic view of lateral sheet-entry guides and a feed rotor of the apparatus of FIGS. 2-10.

When a sheet is inserted into either the wide-entry throat 18 or the narrow-entry throat 22 far enough to reach rotor 24, it is guided partway around drum 26 by the drum itself and by plate portions 78a and blade portions 82c. These arcuate plate and blade portions are relieved so that rotor 24 can press the inserted sheet against the drum, at the same time pressing the drum into optimum cooperation with the reading head. Rotor 24 has a narrow rim 24a. This rim and large-diameter portion 26a of the drum (the same diameter as portion 26b) form a bight which grips the inserted sheet at a localized portion of its width. At the same time, belts 28 and drum 26 carry the sheet into the apparatus. As represented in FIG. 12, rotation of rotor 24 feeds an inserted sheet inward and induces a sheet that might be inserted at an angle to the feed path to become aligned with the edge guides provided by sub-frame plates 72 and 74. Additionally, the same effect takes place when a narrow sheet is inserted into the narrow throat 82. A narrow sheet becomes aligned with edge guides 74 and 83. (A separate guide may replace guide 74 for narrow sheets.) The narrowness of engagement of rotor 24 with the sheets being inserted promotes rapid alignment of the inserted sheets with their edge guides, both side-to-side and angularly. This alignment takes place in the region before the sheets become gripped between belts 28 and drum 26.

Figure 7:
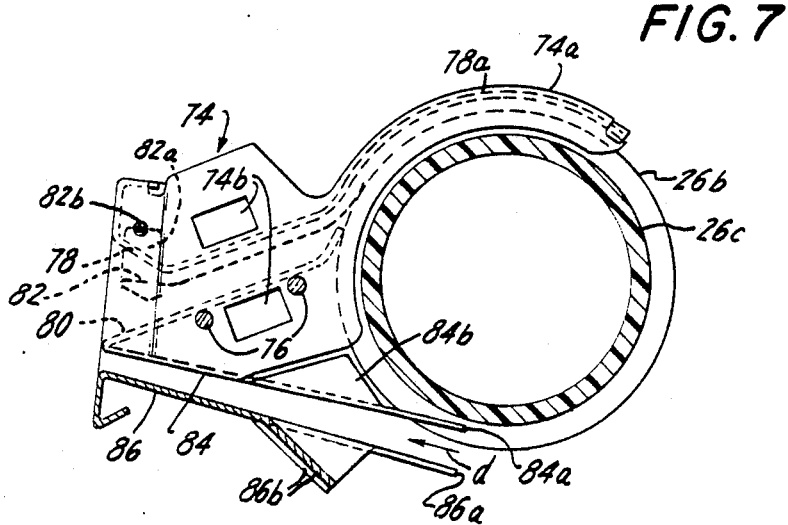
FIG. 7 is a fragmentary cross-section of portions of the apparatus of FIG. 5 at the plane 7—7 therein.
Figure 8:
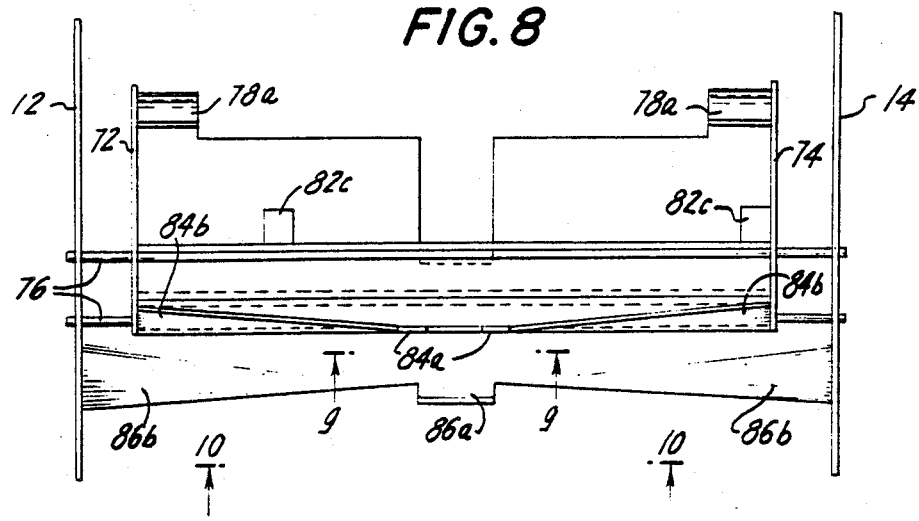
FIG. 8 is an elevation of the sheet-entry and delivery guides of the apparatus in FIGS. 2 through 6, as viewed from the plane 8—8 in FIG. 4.

As best seen in FIG. 4, sheet detectors 88 and 90 are provided at sub-frame plates 72 and 74, respectively. Each of these sheet detectors may take the form of a light source at one side of the throat, and a photo-detector at the opposite side of the throat. The light source and the sensor of each detector extend through plates 72 and 74, e.g. holes 74b (FIG. 7). When a narrow sheet is inserted, only sheet detector 88 is activated. The motor 70 starts, and the computer logic causes the computer to respond to the reading head according to the code that characterizes narrow sheets. When sheet detector 90 is activated, the motor starts and the computer logic causes the computer to respond to the reading head according to the code that characterizes wide sheets.

The sheets which were inserted into the apparatus, and aligned by virtue of narrow rotor 24 cooperating with the edge guides for the narrow and wide sheets, respectively, are oriented for directing the tracks of data that are entered on those sheets into alignment with the respective sensing elements 60, 62 of the reading head. In some instances, the inserted sheets may be crumpled too badly to produce meaningful signal output. In any case, it is important for an inserted sheet to travel around the drum and out of the exit throat even if it is too badly distorted for reading. It is accordingly a feature of the feed structure that the exit throat is wider than the wide entry throat. This will be recognized in that the edge guides 72, 74 for the wide entry throat are closer together than the edge guides represented by plates 12 and 14 of the exit guide.

Figure 9:
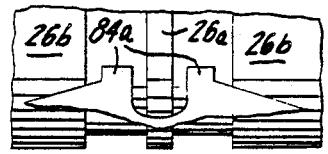
FIG. 9 is a fragmentary view of the apparatus in FIGS. 2–6 as seen from the plane 9—9 in FIG. 8.
Figure 10:
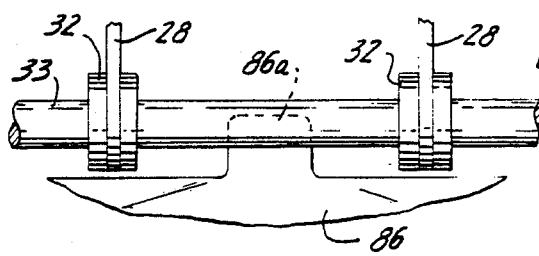
FIG. 10 is a fragmentary view of the apparatus of FIGS. 2-6 as seen from the plane 10—10 in FIG. 8.

As seen in FIG. 7, a sheet emerging from the confines of belts 28 and drum 26 is travelling along the path represented by arrow d. Such a sheet may be somewhat crumpled, and yet it is important for the apparatus to guard as well as may be, against the sheet becoming jammed. Exit throat 20 is formed of plates 84 and 86 as seen in FIGS. 6 to 10, each including a projection 84a, 86a respectively, that is distinctly outside any possible feed path of the sheet. Thus, parts 84a extending from the rear or right-hand end (FIG. 6) of plate 84 are received in relieved portions of the drum flanking raised portion 26a (FIG. 9). Similarly, tongue 86a extends near shaft 33 of idler 32, while belts 28 and drum parts 26b define the path of parts of an exiting sheet. At opposite sides of each of these projections 84a and 86a of the exit throat plates, those plates have outward flaring parts 84b and 86b which guide even crumpled portions of a sheet into the exit throat.

Various aspects of the invention have been set forth in the foregoing description and in the appended claims. In some instances, portions of the illustrative apparatus have been indicated as optional. Those skilled in the art will readily make other modifications and improvements, and the novel features may be adapted to other purposes. Therefore, the claims should be broadly construed in accordance with the true spirit and scope of the invention.

What is claimed is:

1. Data reading apparatus including a reading head, entry and exit throats at a common location and sheet-feeding means for carrying inserted sheets continuously along a path from said entry throat in an initial direction, past said reading head and out of said exit throat in a direction approximately opposite the initial direction, said sheet-feeding means including a drum for supporting a sheet opposite the reading head, said drum being movable toward and away from a reading face of said reading head, gaging means cooperating with both said reading head and said drum for limiting the approach of the drum toward the reading face, and spring means for biasing the drum toward the reading face.

2. Data reading apparatus as in claim 1 wherein said sheet feeding means includes multiple endless belts spaced apart along the drum, each belt having multiple belt-guiding pulleys, each endless belt being looped about a pair of its pulleys with sheet-gripping and return lengths of each belt extending around an arc of the drum and with the sheet-gripping length of each belt holding a sheet against the drum as the sheet is being fed past the reading head.

3. Data reading apparatus including a reading head, entry and exit throats at a common location and sheet-feeding means for carrying inserted sheets continuously along a path from said entry throat in an initial direction, past said reading head and out of said exit throat in a direction approximately opposite the initial direction, said sheet-feeding means including a drum for supporting a sheet opposite the reading head, said sheet-feeding means including multiple endless belts spaced apart along the drum, each belt having multiple belt-guiding pulleys, each endless belt being looped about a pair of its pulleys with sheet-gripping and return lengths of each belt extending around an arc of the drum and with the sheet-gripping length of each belt holding a sheet against the drum as the sheet is being fed past the reading head, at least one of said belt-guiding pulleys of each belt being movably mounted and spring-biased for tensioning the sheet-gripping length of each belt around an arc of the drum, said tensioned sheet-gripping lengths of the belts urging the drum away from a reading face of said reading head, and gaging means cooperating with both said reading head and said drum for limiting the approach of the drum toward the reading face, and spring means for biasing the drum toward the reading face, said drum-biasing spring means providing greater bias tending to shift the drum toward the reading face than the bias of the tensioned lengths of the belts tending to shift the drum away from the reading face.

4. Data reading apparatus as in claim 3 wherein further gaging means is interposed between said reading face and the data-bearing faces of sheets fed past the reading head for limiting the minimum gap between the reading face and sheets fed past the reading head.

5. Data reading apparatus including a reading head, entry and exit throats at a common location and sheet-feeding means for carrying inserted sheets continuously along a path from said entry throat in an initial direction, past said reading head and out of said exit throat in a direction approximately opposite the initial direction, said sheet-feeding means including a drum for supporting a sheet opposite the reading head, said drum being movable toward and away from a reading face of the reading head, spring means for biasing the drum toward the reading face, and gaging means interposed between said reading face and the data bearing surface of a sheet being fed past the reading face for limiting the minimum gap between the reading face and sheets fed past the reading head.

6. Data reading apparatus as in claim 1 or 5 wherein said sheet-feeding means includes multiple endless belts spaced apart along the drum, each belt having multiple belt-guiding pulleys, each endless belt being looped about a pair of its pulleys with sheet-gripping and return lengths of each belt extending around an arc of the drum and with the sheet-gripping length of each belt holding a sheet against the drum as the sheet is being fed past the reading head, at least one of said belt-guiding pulleys of each belt being movably mounted and spring-biased for tensioning the sheet gripping length of each belt around an arc of the drum 7. Data reading apparatus including a reading head and means for feeding data bearing sheets past said reading head, said sheet feeding means including a floating drum movable toward and away from the reading head, spring means for biasing the drum toward the reading head, gaging means in contact with both the drum and the reading head both when a sheet is absent and when a sheet of normal thickness is interposed between the reading head and the drum for limiting the movement of the drum toward the reading head, and means for holding sheets to be read againsat the drum as they pass the reading head.

8. Data reading apparatus as in claim 7 wherein said holding means includes multiple spaced-apart endless belts having sheet gripping lengths tensioned about an arc of said drum opposite the reading head.

9. Data reading apparatus as in claim 8 wherein said drum is hollow, wherein said endless belts are trained about multiple pulleys including a drive pulley for each of said belts, and wherein said sheet feeding means includes a motor disposed in the hollow of the drum and coupled to the drive pulleys.

10. Data reading apparatus including a supporting frame, a data reading head, and sheet-feeding means for feeding successive sheets past said reading head to be scanned thereby, said sheet-feeding means including a drum for supporting sheets opposite said reading head and for carrying such sheets along an arcuate path past said reading head, means for rotatably supporting said drum, and an electric motor having a drive shaft coupled to said sheet-feeding means, said electric motor being mounted on said frame and being disposed at least largely within said drum and said means for rotatably supporting said drum being adapted to accommodate shifting of the drum transverse to its axis and toward and away from the reading head and transverse to the drive shaft of the motor.

11. Data reading apparatus as in claim 10 wherein said sheet-feeding means further includes a drive pulley coupled to said motor and an endless belt driven by said pulley, a length of said belt being tensioned about part of the drum and arranged to hold sheets against the drum as they pass the reading head.

12. Data reading apparatus including a reading head, sheet-feeding means for carrying successive sheets along a path past the reading head, said sheet-carrying means including a drum disposed opposite said reading head, means supporting said drum for movement toward and away from said reading head, means limiting the movement of the drum toward said reading head, a resiliently biased roller for applying pressure to said drum at a point arcuately spaced from said reading head for thereby biasing the drum toward the reading head, and belt means extending about a substantial arc of said drum including the portion of the drum opposite the reading head for holding sheets against the drum, said belt means being tensioned and thereby biasing the drum away from the reading head, the bias of said resiliently biased roller urging the drum toward the reading head being greater than the bias of said belt means urging the drum away from said reading head.

13. Data reading apparatus as in claim 12, wherein said means limiting the movement of the drum toward the drum includes gaging means cooperating directly with both said reading head and the segment of the drum opposite said reading head.

14. Data reading apparatus as in claim 12 or 13, further including spacing means interposed between said reading head and said path of successive sheets carried past the head for assuring space between such sheets and the reading head.

15. Data reading apparatus including a reading head, entry and exit throats at a common location and sheet-feeding means for carrying inserted sheets continuously along a path from said entry throat in an initial direction, past said reading head and out of said exit throat in a direction approximately opposite the initial direction, said sheet-feeding means including a hollow drum for supporting a sheet opposite the reading head, said drum being movable toward and away from a reading face of said reading head, spring means for biasing said drum toward the reading face, said drum having a hollow, and a motor forming part of said sheet-feeding means mounted as a fixed part of said apparatus and disposed in the hollow of the movable drum.

16. Data reading apparatus as in claim 15 further including gaging means limiting the approach of the drum toward the reading head.

17. Data reading apparatus as in claim 15 or 16 wherein said sheet-feeding means includes endless belts having tensioned sheet-gripping lengths for holding sheets against the drum at the side thereof facing the reading head and belt-supporting pulleys for said belts including a drive pulley for each belt coupled to said motor.

* * * * *